United States Patent [19]

Jasper

[11] Patent Number: 4,802,767
[45] Date of Patent: Feb. 7, 1989

[54] METHOD AND APPARATUS FOR OPTICAL NUTATION SENSING

[75] Inventor: Warren J. Jasper, Raleigh, N.C.

[73] Assignee: Hughes Aircraft Company, Los Angeles, Calif.

[21] Appl. No.: 881,433

[22] Filed: Jul. 2, 1986

[51] Int. Cl.$^4$ .................... G01B 9/02; G01C 19/64
[52] U.S. Cl. .................................... 356/350
[58] Field of Search ...................... 356/350; 372/94

[56] References Cited

PUBLICATIONS

Advanced Electronics & Digital Sensor Technology Final Report, vol. V, Inertal Sensors, Jan. 1979, Martin Marietta Corp., Orlando, Fla., pp. (1–9) one page.
"The Ring Laser", Macek et al., Sperry Eng. Rev., vol. 19 (1966), p. 14.
"Fiber-Optic Rotation Sensor: Toward and Integrated Device", Arditty et al., Conf. on Lasers & Electro-Optics, 1981.
"Fiber-Optic Rotation Sensors and Related Technologies" Ezekiel e t al., Proc. of 1st Inter. Conf. MIT, Cambridge, Mass., Nov. 9–11 (1981).
"Dual-Spin Spacecraft Stabilization Using Nutation Feedback and Inertia Coupling" Smay, Journal of Space Craft & Rockets, vol. 13, #11, 650–659 (1976).
"Sagnac Effect", Post, Reviews of Modern Physics, vol. 39, pp. 475–494 (1967).
"Fiber Optic Ring Interferometer" Vali et al., Applied Optics, vol. 15, #5, pp. 1099–1100 (1976).
"Fiber Optics for Communications & Control", Gross, Proc. Soc. Photo‘4 Opt. Instrum. Eng., vol. 224, pp. 38–45 (1980).
"An Optical Rotation Sensor Based on the Sagnac Effect Using a Fiber Ring Interferometer", Schiffner, Meeting on Opt. Comm–Berlin, Germany (1980).

Primary Examiner—Vincent P. McGraw
Attorney, Agent, or Firm—S. M. Mitchell; M. J. Meltzer; A. W. Karambelas

[57] ABSTRACT

An optical nutation sensing method and apparatus is provided which is functional at low spin rates and during thruster firings while being relatively insensitive to spacecraft flexures. The advantageous operation of the present invention is afforded by provision of first and second beams of coherent light energy in opposite directions into a coil of optic fiber or other suitable means for restraining the path thereof. The coil lies in a plane normal to the transverse angular momentum vector. The beams are combined at the output ends of the coil in such a way as to create an interference pattern which varies as the satellite nutates. The variation in the interference pattern is detected by photodetector circuitry to provide an output signal representative of the nutation.

9 Claims, 3 Drawing Sheets

METHOD AND APPARATUS FOR OPTICAL NUTATION SENSING

BACKGROUND OF THE INVENTION

1. Field of the Invention

The present invention relates to systems for sensing the motion of a vehicle. Particularly, the present invention relates to systems and techniques for sensing satellite nutation.

While the present invention is described herein with reference to a particular embodiment for a particular application, it is understood that the invention is not limited thereto. Those of ordinary skill in the art will recognize additional embodiments and applications within the scope thereof.

2. Description of the Related Art

The advantages of spin stabilization for satellite attitude control have been repeatedly demonstrated. Unfortunately, spin stabilized satellites are inherently susceptible to nutation. That is, in the absence of external torques, the angular momentum vector of a spin stabilized satellite would be fixed in inertial space. Nutation, a coning or precessing motion of the spin axis, fixed in the body, around the angular momentum vector, results from the misalignment of the spin axis by a transverse angular momentum. Transverse angular momentum may be induced by the firing of control thrusters during attitude and orbit correction maneuvers; by the motion of articulated payload elements; by the effects of flexible elements; or by the sloshing of liquids in the spacecraft.

Whatever the cause, accurate spin stabilized satellite attitude control requires the damping of nutation. To this end, nutation sensors are used in conjunction with mechanical elements located on the spacecraft. The mechanical elements provide the energy dissipation (or addition) required to reduce the wobble by removing the transverse angular momentum vector.

Nutation sensors are typically linear accelerometers mounted on the rim of the spacecraft. The accelerometer is often a hinged pendulus mass, mounted to sense the up and down motion, due to nutation, along an axis parallel to the spin axis.

Current nutation sensors have limited low frequency response. As a result, such sensors have difficulty measuring very slow nutation frequencies as may be experienced by large structures having low spin rates. For such applications, it is desirable to provide an accurate low speed nutation sensor.

A second shortcoming of current nutation sensors is that they tend to misinterpret the acceleration due to the firing of the thrusters as nutation. Accordingly, the output of the sensor is invalid, if uncorrected, during thruster firings. This is undesirable as information due to nutation during thruster firing may be used to provide for greater control and efficiency during such manuevers. This in turn would allow for lower fuel costs and less time to execute a particular maneuver. Thus it is generally desirable to provide a nutation sensor which is accurate during thruster firings.

A third shortcoming of many current nutation sensors is that for large spacecraft having low spin rates, the accelerometer sensor must be placed far from the spin axis to develop a sufficiently strong output signal. An example of such an spacecraft is the Space Station currently under development by NASA.

As the distance from the spin axis increases, however, the effects of flexibility have a more significant impact on the sensor output. Thus, under some circumstances, the flexure of the spacecraft may be interpreted as nutation. It is generally desirable therefore to provide a nutation sensing system which provides an output independent of the flexure modes of the spacecraft.

SUMMARY OF THE INVENTION

The shortcomings illustrated by the related art are addressed by the optical nutation sensing method and apparatus of the present invention which is functional at low spin rates and during thruster firings and which is relatively insensitive to spacecraft flexures. The advantageous operation of the present invention is afforded by provision of first and second beams of coherent light energy in opposite directions into a coil of optic fiber or other suitable means for restraining the path thereof. The coil lies in a plane normal to the transverse angular velocity of the satellite. The beams are combined at the output ends of the coil in such a way as to create an interference pattern which varies as the satellite nutates. The variation in the interference pattern is detected by photodetector circuitry to provide an output signal representative of the nutation.

DESCRIPTION OF THE INVENTION

As discussed more fully below with reference to FIGS. 1-6, the present invention provides a nutation sensing apparatus and method which effectively senses nutation at low nutation (or spin) rates, during thruster firings, and without sensitivity to spacecraft flexures. The invention includes a coil of optic fiber having two loops into which two beams of coherent light are transmitted in opposite directions. Each loop of the coil (which may have multiple turns) lies in a plane normal to the transverse angular velocity vector. The beams are combined at the output of the coil to provide an interference pattern which varies as the satellite nutates.

Figure 1:
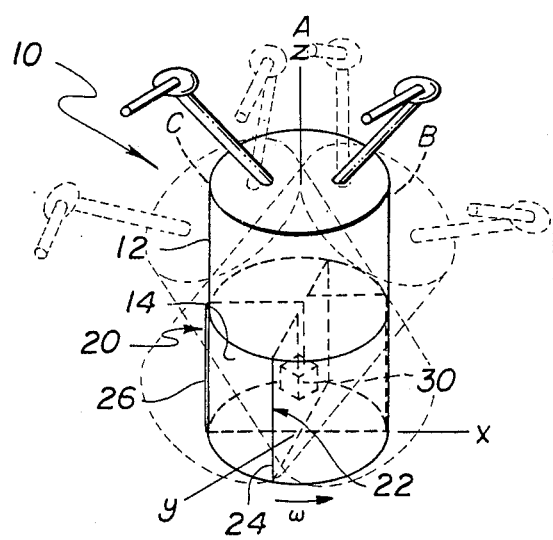
FIG. 1 is partial view of the present invention in its intended operational environment.

FIG. 1 shows a spin stabilized satellite 10 having a despun portion 12 and a spun portion 14. The satellite is equipped with the optical nutation sensor 20 of the present invention. FIG. 1 is illustrative of an external mounting arrangement by which a coil of optical fiber 22 having two orthogonal loops 24 and 26 is mounted at or near the periphery of the spinning portion 14 of the satellite 10 external to the beamsplitter/detector 30. The coil 22 may be substituted with any suitable means for restraining the path of light. It is also undesirable that other mounting arrangements are attainable as is known to those of ordinary skill in the art. For example, the coil 22 may be mounted in the package with the beamsplitter/detector 30.

Figure 2:
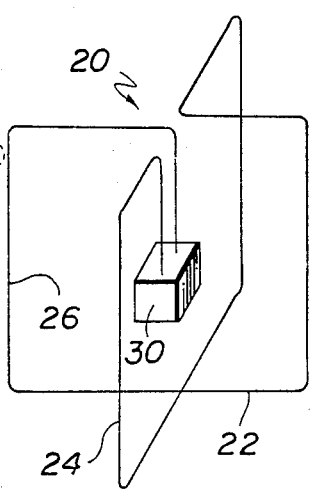
FIG. 2 is a perspective view of a preferred embodiment of the present invention.

FIG. 2 is a stand-alone view of the optical nutation sensor 20 of the present invention which more clearly shows the two orthogonal loops 24 and 26 of the fiber optic coil 22. As will be discussed more fully below, the present invention is fully operational with a single loop. Two loops are shown in the preferred embodiment of FIG. 2 as a best mode of practicing the invention for the following reason. For large spacecraft having low nutation rates, the output of a single loop could go to zero during a portion of the cycle. This could be misinterpreted as "no nutation" by the beamsplitter/detector 30. Two orthogonal loops provide a higher average output signal in that while the path length interference pattern associated with one loop is low, that associated with the orthogonal loop would be high. It is to be understood that the present invention is not limited to the number of loops used. It is noteworthy, however, that the present invention achieves the advantages of two fiber optic coils while using a single coil. That is, since the coil 22 is wound into two orthogonal loops the advantages of two coils are attained without any duplication of hardware.

Whether one coil is used or several coils, the coil will be sensitive to nutation to the extent that a loop lies in a plane substantially normal to the transverse angular velocity vector of the satellite. As the spin rate is normally much greater than the rate of nutation, the loop (spinning at the satellite spin rate) will eventually be normal to the transverse angular velocity vector. At that point, it will be most sensitive to nutation.

Figure 3:
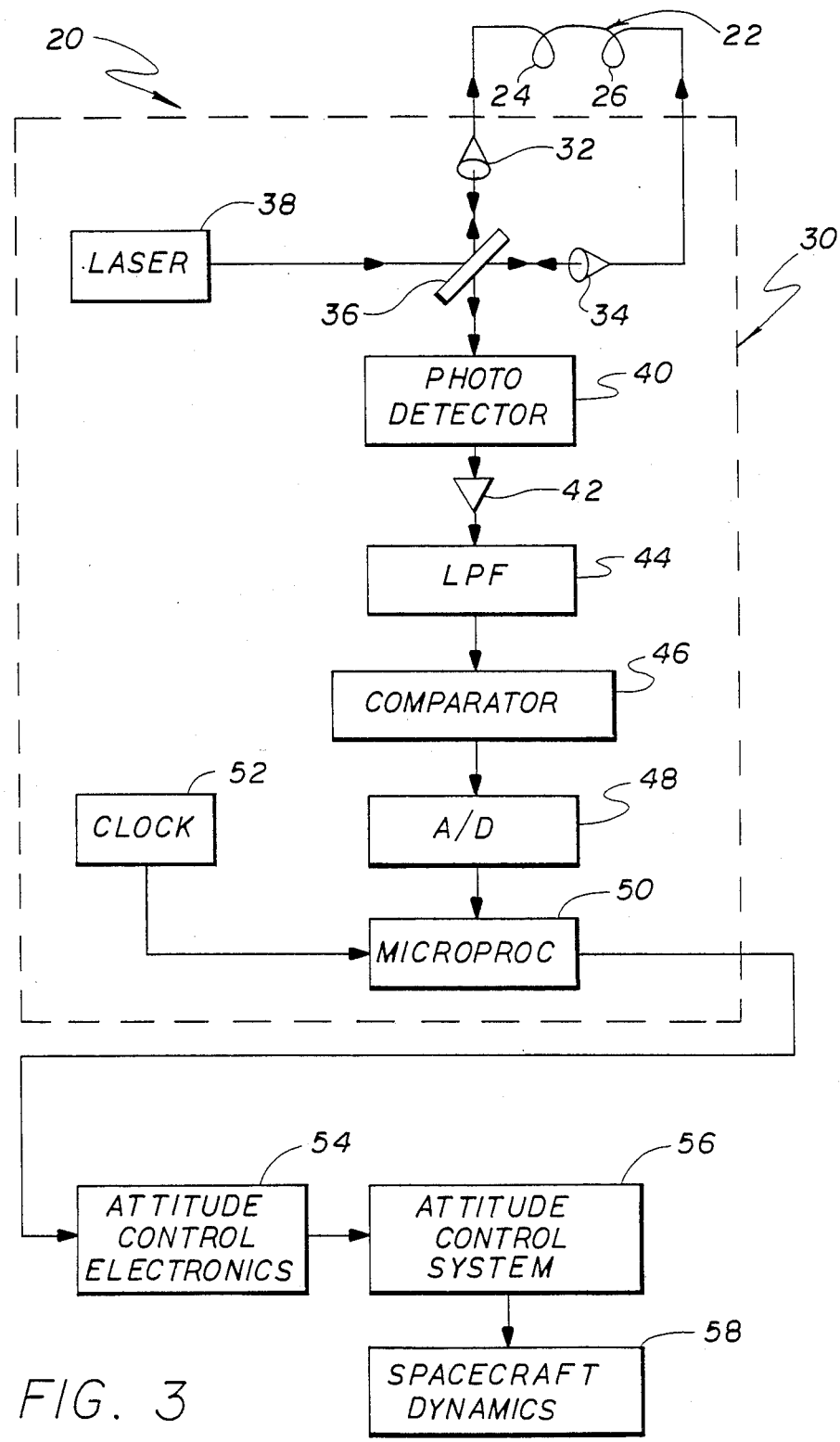
FIG. 3 is a diagrammatic view of an illustrative implementation of the present invention.

FIG. 3 provides an illustrative implementation of an optical nutation sensor 20 utilizing the teachings of the present invention. The sensor 20 includes the coil 22 with first and second orthogonal loops 24 and 26 respectively. The ends of the coil 32 and 34 are fixed within the beamsplitter/detector 30 in optical alignment with a beamsplitter 36. The beamsplitter 36 is an off-the-shelf beamsplitter as is known in the art. To minimize weight requirements, the beamsplitter 36 may be an optical thin film coating on a thin plate of optical grade glass or silica. A low power laser 38 is aligned with the beamsplitter 36 so that its output beam of coherent light energy is split into first and second beams having first and second polarization states respectively. Thus, light of a first polarization state is substantially reflected by the beamsplitter 36, while that of second polarization state is substantially transmitted. The first and second beams are input to the first and second ends 32 and 34 respectively of the coil 22.

The beamsplitter 36 also provides means for recombining the first and second beams into a single output beam. That is, once again, the light of the first polarization state is substantially reflected by the beamsplitter 36, while that of second polarization state is substantially transmitted. The output beam is input to an off-the-shelf photodetector 40. The photodetector 40 provides an analog output to an optional signal conditioning circuit including an amplifier 42, a low pass filter 44, comparator 46, analog to digital converter 48, microprocessor 50 and clock 52. The amplifier 42 boosts the level of the photodetector output signal to bring it within the input dynamic range of the low pass filter 44. The low pass filter 44 serves to remove noise from the signal prior to input to the comparator 46. The comparator 46 sets the operating point of the detector as discussed below. The output of the comparator 46 is digitized by an analog to digital converter 48 and input to a microprocessor 50. The microprocessor uses input from a clock 52 to compute the rate of nutation. This is done using a Kalman filter or estimation technique as is known in the art. The output of the microprocessor 50 is input to the satellite attitude and control electronics unit 54. The attitude and control electronics unit 54 provides control signals to an attitude control system 56 which typically includes mechanical nutation damping apparatus. Through mechanical coupling, the attitude control system 56 effects the spacecraft dynamics 58 to reduce the sensed nutation.

In operation, the laser 38 provides an input beam of coherent light to the beamsplitter 36. The beamsplitter 36 reflects light of one polarization to one end 32 of the coil 22 and transmits light of a second polarization to a second end 34 of the coil 22. Thus two beams of coherent light are input to the coil 22 in opposite directions. The two beams travel through the coil 22, emerge from the ends 32 and 34 of the coil 22, are recombined by the beamsplitter 36 into a single beam which irradiates the photodetector 40.

Figure 4:
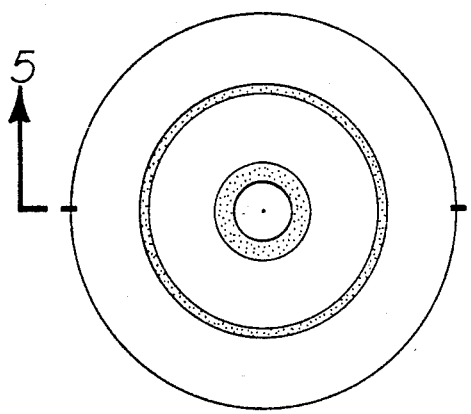
FIG. 4 is an end view of the optic fiber used in the present invention showing the interference pattern of the combined beams.
Figure 5:
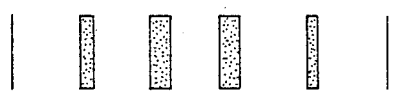
FIG. 5 is an the interference pattern seen by the end view of the optic fiber of FIG. 4 by the photodetector of the present invention.
Figure 6:
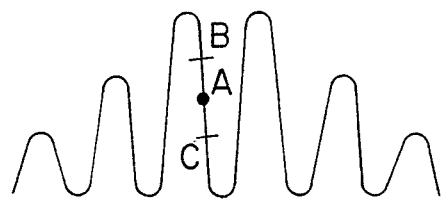
FIG. 6 is representative of the analog output of the photodetector of the present invention resulting from a scan of the interference pattern of FIG. 5.

In FIG. 1, the spin axis of the satellite 10 and the system angular momentum vector are aligned and lie along the z axis. This represents an absence of nutation during which the two beams combine to create an initial interference pattern as illustrated in FIG. 4. The photodetector 40 will see a slice of the radial interference pattern of FIG. 4 which would appear as shown in FIG. 5. If the photodetector 40 has a single photodetective diode and it scanned the linear interference pattern of FIG. 5, its output would approximate that shown in FIG. 6. If, instead of scanning, the photodetective diode were held in a fixed position, as in the preferred embodiment of the present invention, its output would be a voltage level (or current level) such as that at the operating point A of FIG. 6. The output of the comparator 46 (essentially a differential amplifier with negative feedback) would be zero indicating no nutation.

Assuming that a transverse angular momentum is applied to the satellite 10 of FIG. 1 and that it nutates such that its spin axis (longitudinal axis) is misaligned with the system angular momentum vector which remains fixed in inertial space, the satellite may have an instantaneous nutation position as shown in phantom at point B. At the moment the satellite is at point B, the loop 26 lies in a plane parallel to the instantaneous plane of nutation (the xz plane). While it is understood that the satellite will undergo a coning motion, the loop will be sensitive to that component of the coning mutation which lies in the plane parallel to the loop 26.

Thus, as the satellite 10 nutates toward the $-x,z$ plane the path length of one beam traveling through the coil 22 will be lengthen while that of the other beam will be shortened. The result is a change in the interference pattern of FIGS. 4 and 5. It is clear that the output of the photodetector 40 will move from point A to point B and from point B to point C as the satellite 10 continues to nutate.

Figure 7:
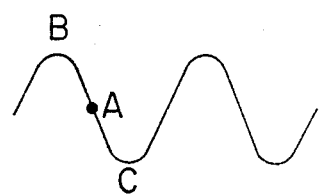
FIG. 7 shows a typical output of the comparator for a single loop embodiment of the present invention.
Figure 8:
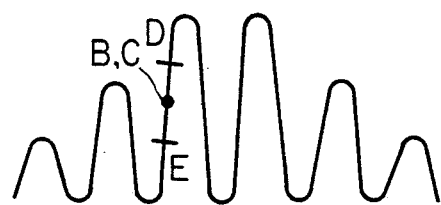
FIG. 8 is representative of the analog output of the photodetector of the present invention resulting from a scan of the interference pattern associated with the orthogonal loop of the preferred embodiment.
Figure 9:
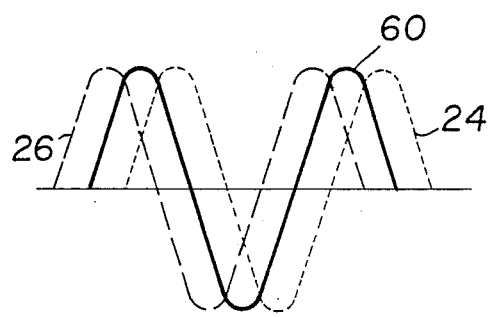
FIG. 9 shows the output of the comparator associated with the orthogonal loops of the preferred embodiment of the present invention.

As such, point A now represents a point of ambiguity. That is, an output at point A could signal no nutation or either of two crossings of the z,y plane. However, the illustrative waveform of FIG. 8 showing a single loop detector output for the loop 24, indicates that the orthogonal loop 24 will complement loop 26 and provide a high output when the satellite 10 crosses the z,y plane. Thus, while FIG. 7 shows the typical sinusoidal output of the comparator 46 for the single loop case, FIG. 9 shows the output 60 of the combined (summed) interference patterns associated with the loops 24 and 26. The amplitude of waveform 60 is indicative of the amount of nutation, the periodicity indicates the rate, and the phase of the waveform indicates the direction of nutation.

Thus the waveform 60 is digitized by the A/D converter 48 and used by the microprocessor 50 with input from the clock 52 (in the illustrative implementation of FIG. 3) to provide signals to the attitude control electronics system 54 indicative of the amplitude, rate and direction of nutation. The attitude control electronics system 54 provides appropriate corrective signals to the electromechanical attitude control system 56 which corrects the spacecraft mechanics in a manner known to those skilled in the art.

The principle of operation of the present invention is the well known Sagnac Effect as described in the literature of which the following is a sample:

1. "Sagnac Effect", E. J. Post, REVIEWS OF MODERN PHYSICS, Vol. 39, pp. 475-494 (1967);
2. "Fiber Optic Ring Interferometer", V. Vali and R. W. Shorthill, APPLIED OPTICS, Vol 15, No. 5, pp. 1099-1100 (1976);
3. "Fiber Optics for Communications and Control", W. C. Goss, PROC. SOC. PHOTO-OPT. INSTRUM. ENG., Vol. 224, pp. 38-45 (1980);
4. ∫An Optical Rotation Sensor Based on the Sagnac Effect Using a Fibre Optics Ring Interferometer", G. Schiffner, Meeting on Optical Communications—Berlin Germany (1980);
5. "Fiber-Optic Rotation Sensor: Toward and Integrated Device; A Review", H. J. Arditty, M. Papuchon, and C. Puech; CLEO '81. Conference on Lasers and Electro-Optics (paper in summary form only), (1981);
6. *Fiber-Optic Rotation Sensors and Related Technologies*, S. Ezekkiel and H. J. Arditty, Proceeding of the First International Conference MIT, Cambridge, MA, Nov. 9-11 (1981).

Thus, the present invention has been described with reference to an illustrative implementation and a particular application. Those of ordinary skill in the art having access to the teachings of the present invention will recognize additional implementations within the scope thereof. For example, it is not necessary that light be used to practice the present invention. Any form of energy which will provide an interference pattern will suffice. As mentioned above, the invention is not limited to the use of an optic fiber. Any suitable means for restraining light may be used. The invention is similarly not limited to the number of coils or loops shown herein. Nor is the invention limited to a particular packaging or mounting arrangement. The method used to detect the beams of light and the form in which the output signals are presented to the satellite control system is also not critical to the invention.

It is intended by the appended Claims to cover any and all such alternative implementations and embodiments.

Therefore,

What is claimed is:

1. A nutation sensor for sensing nutation in a spin stabilized satellite having a transverse angular momentum vector comprising:
   coil means for restraining the path of a beam of energy, said coil means including a coil of optic fiber having two substantially orthogonal loops each loop lying in a plane substantially normal to said transverse angular momentum vector;
   means for providing a first beam of coherent energy in a first direction along said path and a second beam of coherent energy in a second direction along said path;
   means for combining said first and second beams at an output end of said path to form a composite beam; and
   means for analyzing the composite beam to provide an output signal representing the nutation of said satellite with respect to a frame of reference.

2. The nutation sensor of claim 1 wherein said means for providing first and second beams of coherent energy along said path includes laser means for providing an input beam.

3. The nutation sensor of claim 2 wherein said laser means includes an optical beamsplitter for dividing said input beam into said first and second beams.

4. The nutation sensor of claim 3 wherein said means for combining said first and second beams includes an optical beam combiner.

5. The nutation sensor of claim 4 wherein said optical beamsplitter is also said means for combining said first and second beams.

6. The nutation sensor of 5 wherein said means for analyzing the composite beam to provide an output signal representing the nutation of a vehicle with respect to a frame reference includes circuit means for detecting a change in intensity of energy.

7. The nutation sensor of claim 6 wherein said circuit means includes photodetector means.

8. A nutation sensor for sensing nutation in a spin stabilized satellite having a transverse angular momentum vector comprising:
   a coil of optic fiber having two substantially orthogonal loops each loop lying in a plane substantially normal to said transverse angular momentum vector and having first and second ends for receiving input and providing output;
   means for providing first and second beams of coherent energy;
   beamsplitter means for directing said first beam of light energy into said first end of said coil and for directing said second beam of liguht energy into said second end of said coil;
   means for combining said first and second beams at the output ends of said coil; and
   means for analyzing the combined beam to provide an output signal representing the nutation of said satellite.

9. An improved method of sensing nutation including the steps of:
   (a) providing two mutually orthogonal paths for restraining energy, each path lying in a plane substantially normal to a transverse angular momentum vector;
   (b) inputting into said path a first beam of energy along a first direction and a second beam of energy along a second direction;
   (c) combining said first and second beams to provide an interference pattern; and
   (d) analyzing the interference pattern to provide an output representing nutation.

* * * * *